Patented Aug. 11, 1942

2,292,503

UNITED STATES PATENT OFFICE 2,292,503

PURIFICATION OF CALCIUM CARBONATE

Edward M. Allen, Copley, Ohio, assignor to Pittsburgh Plate Glass Company, Allegheny County, Pa., a corporation of Pennsylvania No Drawing. Application May 4, 1939,
Serial No. 271,717

17 Claims. (Cl. 23—66)

This invention relates to a method of purifying calcium carbonate and of obtaining a relatively pure carbonate from various mixtures containing this material and also to a method of separating calcium and magnesium carbonates. It is found that calcium carbonate is often contaminated with various impurities such as calcium hydroxide, silica, iron, aluminum, magnesia, grit or other agents which make the material unsuitable for many uses. In accordance with my invention, I have found that very pure grit-free calcium carbonate may be secured from impure mixtures containing the same. The carbonate so produced is very clean and white and may be used as a paint, paper and rubber pigment or filler.

This process is particularly adapted to the treatment of crude calcium carbonate which contains grit or other impurities such as ordinary limestone or waste limestone or calcium carbonate sludges which are produced as wastes or by-products in various commercial processes. It may be carried out by forming an aqueous slurry of the product to be treated and introducing enough alkali metal carbonate into the slurry to cause precipitation of a double salt of the alkaline earth metal and the alkali metal carbonate which is generally represented by the formula

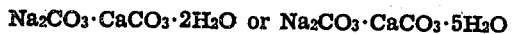

$Na_2CO_3 \cdot CaCO_3 \cdot 2H_2O$ or $Na_2CO_3 \cdot CaCO_3 \cdot 5H_2O$

This double salt separates out in the form of relatively coarse and heavy, prismatic crystals which may be settled or otherwise removed from the solution. A substantial portion of the impurities, on the other hand, remain in the form of finely divided particles which are suspended as a slime in the aqueous slurry. The coarser crystals of the double salt may be separated from the sludge or slime of impurities by suitable classification methods such as by filtration through a coarse filter of such porosity as to permit the fine impurities to pass through the filter without passage of the double salt. Other convenient methods of classifying materials of various sizes may be used and in some cases the impurities may be removed by decantation since the double salt crystals settle and accumulate at the bottom of the container in which the slurry is disposed. Other suitable classification or elutriation methods may be similarly applied as will be understood by those skilled in the art.

The double salt crystals may be washed in suitable manner and may then be agitated with water to dissolve the sodium carbonate or other alkali metal carbonate and precipitate calcium carbonate in a very pure state and in a fine state of division.

The invention may be applied to slurries of impure calcium carbonate which are prepared by any convenient means. Thus, ground limestone, precipitated chalk, calcium carbonate derived from the lime-soda process of preparing caustic soda, or other carbonate may be treated in accordance with this invention. In accordance with one modification, the carbonate may be prepared by reacting a milk of lime slurry with a large excess of sodium carbonate whereby caustic soda and calcium carbonate are formed initially and the sodium carbonate-calcium carbonate subsequently precipitated by excess sodium carbonate. Similarly, a slurry of calcium hydroxide may be carbonated with carbon dioxide and after carbonation is complete, or substantially so, the mixture may be treated to form the required double salt.

The reaction to form the double salt appears to be assisted by the presence of an alkali such as sodium hydroxide or potassium hydroxide. In such a case an alkali metal bicarbonate may be used in lieu of the carbonate, if desired. However, the process can be conducted without use of alkali without difficulty.

The separation of the double salt crystals is a comparatively simple matter, due to the difference in size and weight of the materials involved. Since the double salt crystals settle with reasonable rapidity, much of the impure liquor may be removed by decantation. The remainder may be removed by washing or by fractional filtration or other classifying method.

The resulting double salt, after removal of the fine impurities, may be treated to recover the carbonate or may be further purified. In some cases it is noted that the double salt is contaminated with heavy foreign particles of sand or grit. The double salt may be separated from these particles by various methods. In accordance with one suitable method they may be dispersed in an aqueous slurry containing sufficient alkali metal carbonate to prevent solution thereof and a gas such as air, oxygen, nitrogen, carbon dioxide, or other gas may be bubbled through the slurry. It is found that in such a case the double salt collects in the form of a froth at the top of the slurry and may be withdrawn, leaving the sand or grit behind. Flotation agents may be introduced to assist this action, if desired.

The sodium carbonate-calcium carbonate salt may be washed with cold water or with an aqueous solution of an alkali metal carbonate such as sodium carbonate. After the salt has been washed to the desired degree, the calcium carbonate may be reformed by addition of water. Hot water is generally found to decompose the double salt with greater rapidity than cold water. The calcium carbonate thus formed is found to be very brilliant in color and in an exceptionally fine state of division. It may be used in dentifrices or as a pigment or filler in rubber, paint and paper composition or it may be applied to other uses.

The following examples are illustrative.

*Example I*

By-product whiting of poor color which was obtained from the lime-soda process of preparing sodium hydroxide, and which was contaminated with iron, aluminum, and silica, was pulped in a 10 percent solution of sodium hydroxide to form a slurry containing 200 grams per liter of calcium carbonate. Dry sodium carbonate was added to the slurry in the proportion of 260 grams of sodium carbonate per liter of slurry. The mixture was agitated for a short time after which it was allowed to stand. A large quantity of coarse white crystals settled from the solution, leaving a reddish slimy suspension of fine solids in the solution above the crystals. The liquor containing this slime was decanted and the crystals were washed with a solution containing 100 grams per liter of sodium carbonate. The crystals were then agitated with hot water until they were disintegrated and a slurry of calcium carbonate was formed. The calcium carbonate, after removal of the solution, was brilliantly white and substantially free from impurities.

*Example II*

Lime mud containing 81.9 percent by weight of $CaCO_3$, 5.99 percent $MgO$, 3.92 percent $R_2O_3$, and 2.83 percent $SiO_2$ was pulped in water to form a slurry containing 200 grams per liter of the mud. Dry sodium carbonate was added in the proportion of 275 grams per liter of slurry. The crystals of the double salt were precipitated and recovered as in Example I, and a product containing in excess of 97.5 percent calcium carbonate and only 0.01 percent $MgO$, 0.056 percent $R_2O_3$ and 0.004 percent $SiO_2$ was obtained. The impurities were recovered from the sludge and were found to contain in excess of 35 percent $MgO$, and 15 percent $R_2O_3$ and 7.63 percent of $SiO_2$.

As illustrated in Example II, it is apparent that the present process is applicable to the concentration of magnesium oxide or hydroxide, silica, aluminum oxide or other impurity which may be present in lime.

In similar manner, the process may be applied to the separation of magnesium carbonate from calcium or other alkaline earth metal carbonate. Thus, it is possible to recover concentrates of both magnesium and calcium carbonate from crude mixtures of these materials. For example, dolomite lime containing approximately equimolecular amounts of calcium and magnesium carbonate may be treated with sufficient soda ash to cause precipitation of the double salt of calcium and sodium carbonate without precipitation of the double salt of magnesium and sodium carbonate. It is found that a very accurate separation may be secured by agitation of a slurry of dolomite or similar magnesium lime with an excess of sodium carbonate for several hours at room temperature and recovering the precipitated double salt of calcium and sodium.

If desired, the magnesium may be recovered as the hydroxide by treating the product in the presence of an alkali metal hydroxide such as sodium hydroxide. The sodium hydroxide may be generated in situ if desired by addition of calcium oxide or hydroxide to the slurry during treatment with sodium carbonate.

While the process has been described with particular reference to sodium carbonate, other alkali metal carbonate such as potassium or lithium carbonate may be used to form the double salt.

Although the present invention has been described and claimed with particular reference to the specific details of certain embodiments thereof, it is not intended that such details shall be regarded as limitations upon the scope of the invention except insofar as included in the accompanying claims.

I claim:

1. A method of purifying impure calcium carbonate which comprises forming an aqueous slurry thereof, treating said slurry with an alkali metal carbonate in an amount sufficient to cause formation of a substantial quantity of double salt of said carbonates in the form of relatively coarse crystals, recovering the crystals free from a substantial portion of the solid impurities in said slurry and treating them to recover the calcium carbonate from said salt.

2. A method of purifying impure calcium carbonate which comprises forming an aqueous slurry thereof, treating said slurry with sodium carbonate in an amount sufficient to cause formation of a substantial quantity of double salt of said carbonates in the form of relatively coarse crystals, separating solid impurities in said slurry from said salt and recovering the calcium carbonate from said salt.

3. A method of purifying impure calcium carbonate which comprises forming an aqueous slurry thereof, treating said slurry with an alkali metal carbonate in an amount sufficient to cause formation of a substantial quantity of double salt of said carbonates in the form of relatively coarse crystals, separating solid impurities in said slurry from said salt, washing said salt with an aqueous solution of an alkali metal carbonate, and recovering the calcium carbonate from said salt.

4. A method of concentrating magnesium oxide which is present in small concentrations in an impure calcium carbonate which comprises forming an aqueous slurry of the carbonate, treating the slurry with an alkali metal carbonate to form a substantial quantity of a double salt of said carbonates, separating the salt from the remaining solids and recovering the solids.

5. A method of purifying impure calcium carbonate which comprises forming an aqueous slurry thereof, treating said slurry with a sodium carbonate in an amount sufficient to cause formation of a substantial quantity of double salt of said carbonates in the form of relatively coarse crystals, removing solid impurities in said slurry from said salt and recovering the calcium carbonate from said salt by leaching the salt with water to dissolve the sodium carbonate and reform the calcium carbonate in its purified form.

6. A method of purifying an impure calcium carbonate which comprises forming an aqueous slurry thereof, treating said slurry to precipitate a substantial quantity of double salt of sodium and calcium carbonates in the form of relatively coarse crystals, recovering the crystals free from a substantial portion of the solid impurities in said slurry and recovering the alkaline earth metal carbonate from said salt.

7. A method of purifying impure calcium carbonate which comprises forming an aqueous slurry thereof, treating said slurry with sodium carbonate in an amount sufficient to cause formation of a substantial quantity of double salt of said carbonates in the form of relatively coarse crystals, removing solid impurities in said slurry, forming an aqueous slurry containing said double salt, gassing said slurry to cause flotation of the double salt, recovering the said salt and recovering the calcium carbonate from said salt.

8. A method of purifying impure calcium carbonate which comprises forming an aqueous slurry thereof, treating said slurry with sodium carbonate in an amount sufficient to cause formation of a substantial quantity of double salt of said carbonates in the form of relatively coarse crystals, removing solid impurities in said slurry, forming an aqueous slurry containing said double salt, aerating said slurry to cause flotation of the double salt, recovering the said salt and recovering the calcium carbonate from said salt.

9. A method of separating solid impurities from a double salt of sodium and calcium carbonate which comprises forming an aqueous slurry thereof, gassing the slurry to cause flotation of the double salt and recovering the floated salt.

10. A method of separating solid impurities from a double salt of sodium and calcium carbonate which comprises forming an aqueous slurry thereof, aerating the slurry to cause flotation of the double salt and recovering the floated salt.

11. A method of separating calcium carbonate from a material which contains calcium and magnesium carbonate which comprises forming an aqueous slurry thereof, treating the slurry with sodium carbonate to precipitate a substantial quantity of the double salt of calcium and sodium carbonate and separating said salt from the slurry which contains a residue of finely divided magnesium compounds.

12. A method of separating calcium carbonate from a material which contains calcium and magnesium carbonate which comprises forming an aqueous slurry thereof, treating the slurry with sodium carbonate in the presence of an alkali metal hydroxide to precipitate a substantial quantity of double salt of calcium and sodium carbonate and separating the said salt from the slurry which contains a residue of finely divided magnesium compounds.

13. A method of removing calcium carbonate from impure calcium carbonate which comprises forming an aqueous slurry thereof, treating said slurry with an alkali metal carbonate in amount sufficient to cause formation of a substantial quantity of double salt of the said carbonates in the form of relatively coarse crystals, subjecting the slurry to classification to separate relatively fine solid impurities from the double salt and separating the double salt from the relatively heavy impurities by flotation.

14. The method which comprises treating an aqueous slurry containing a calcium and a magnesium compound of the group consisting of the carbonate, oxides and hydroxides thereof which comprises treating said slurry with sufficient alkali metal carbonate to precipitate a substantial quantity of the double salt of calcium and alkali metal carbonates and separating said salt from the unreacted solids whereby a separation of the magnesium and calcium compounds is secured.

15. A method which comprises treating a calcium compound of the group consisting of the oxides, carbonates, and hydroxides thereof which contains solid impurities which comprises treating an aqueous slurry thereof with sufficient alkali metal carbonate to precipitate a substantial quantity of the double salt of calcium and alkali metal carbonates and separating said salt from the unreacted solids.

16. A method which comprises treating a calcium compound of the group consisting of the oxides, carbonates, and hydroxides thereof which contains solid impurities which comprises treating an aqueous slurry thereof with sufficient alkali metal carbonate to precipitate a substantial quantity of the double salt of calcium and alkali metal carbonates, permitting the salt to settle from the slurry and decanting the liquids together with a major portion of the unreacted solids.

17. A method which comprises treating a calcium compound of the group consisting of the oxides, carbonates and hydroxides thereof, which contains a solid impurity of the group consisting of iron, aluminum, magnesium, silica, which comprises treating an aqueous slurry thereof with sufficient alkali metal carbonate to precipitate the double salt of calcium and alkali metal carbonate, separating said salt from the unreacted impurity and treating the double salt to regenerate calcium carbonate.

EDWARD M. ALLEN.